2,814,630

Patented Nov. 26, 1957

2,814,630

PROCESS FOR THE SEPARATION OF SATURATED AND UNSATURATED KETO-STEROIDS

Thomas Walker, South Harrow, and John Francis Oughton, Leytonstone, London, England, assignors to G. N. R. D. Patent Holdings Limited, London, England, a British company No Drawing. Application July 21, 1954, Serial No. 444,916

Claims priority, application Great Britain July 31, 1953

7 Claims. (Cl. 260—397.45)

This invention is concerned with improvements in or relating to the separation of 3-keto-$\Delta^4$-steroids from mixtures of such steroids and 3-keto-4:5-dihydro-steroids.

Whilst such a separation has been previously carried out in steroid chemistry, for example in the separation of cholestanone from cholestenone, we have found it particularly necessary in the synthesis of cortisone, where in certain circumstances it is necessary to separate cortisone or its derivatives, for example its 21-esters or 17:21-diesters from 4:5-dihydroallocortisone or its corresponding derivatives. Thus in copending application No. 441,686, filed July 6, 1954, there is described, inter alia, a process for the preparation of the 21-esters and 17:21-diesters of cortisone from the corresponding 2:4-dibromo-4:5-dihydroallocortisone esters and it is stated that one of the principal difficulties of the process is the appreciable amount of 4:5-dihydroallocortisone esters which is present in the crude reaction mixture. The separation of these two components may present considerable practical difficulties since it is tedious to carry out by physical methods, such as crystallisation and chromatography.

We have now found that 3-keto-$\Delta^4$-steroids and 3-keto-4:5-dihydro-steroids can be separated to a major extent from mixtures containing them by forming their Girard derivatives and subjecting these to selective decomposition as hereinafter described. Thus after the formation of the derivatives by treating the mixed ketones with Girard reagent T or P, the derivative of the saturated ketone is decomposed by treatment with a suitable water-soluble aldehyde as herein defined, the reaction mixture is then diluted with water and buffered to about pH 7, preferably with sodium bicarbonate and the saturated ketone extracted. The pH of the solution is then lowered, preferably to between 1 and 2 to bring about decomposition of the derivative of the unsaturated ketone; this can be accelerated by the addition of pyruvic acid.

Our new process enables steroids of the type referred to, to be separated more efficiently than has heretofore been possible and in many cases substantially complete separation is possible.

According to the present invention, therefore, we provide a process for the separation of 3-keto-$\Delta^4$-steroids from mixtures of such steroids and 3-keto-4:5-dihydroallosteroids in which the said mixed ketones are reacted with Girard reagent T or P to form their derivatives, the resulting mixture is treated with a water-soluble aldehyde which can displace the saturated ketone from its Girard complex whereafter the liberated saturated ketone is separated from the mixture in an aqueous medium, the pH of the aqueous medium being thereafter lowered to liberate and precipitate the unsaturated ketone.

According to a feature of the invention, the pH of the said resulting mixture is lowered to between 1 and 2.

According to a further feature of the invention, after the said treatment with the water-soluble aldehyde, the reaction mixture is diluted with water, buffered to about pH 7 and the saturated steroid extracted.

The water-soluble aldehyde used must, as stated, react with the Girard derivatives of the saturated steroid ketones referred to herein with exchange of the Girard reagent, the Girard derivatives of the suitable aldehyde being formed and the saturated steroid ketone being liberated. We have found that formaldehyde, acetaldehyde and crotonaldehyde are suitable for this purpose; propionaldehyde and furfuryl aldehyde are, however, unsatisfactory. It has not been found possible to classify the types of water-soluble aldehydes which are suitable on the basis of chemical structures. We believe that the suitability of any particular aldehyde is connected with the relative activity of the aldehyde grouping and thus can only be determined by preliminary experiment. We prefer to use formaldehyde as the water-soluble aldehyde.

The Girard derivatives of the mixed ketones can be formed in any convenient manner, for example, by heating the steroid mixture and the Girard reagent in a 10% solution of acetic acid in ethanol for about 10–30 minutes. The solution is then cooled and an amount of a suitable water-soluble aldehyde as herein defined at least equivalent to the amount of Girard reagent used, is added. This results in the liberation of the saturated ketone. The reaction mixture is then preferably poured into an aqueous solution of sodium bicarbonate and the saturated ketone removed by extraction. In some cases we find that the separation may be complicated by reason of relatively low solubility of the Girard complex of the unsaturated ketone; in such cases it is possible to improve the separation by adding to the aqueous mixture a water-miscible organic solvent such as ethanol or dioxan so as to increase the difference between the solubilities of the Girard complex of the unsaturated ketone and the saturated ketone in the medium.

After extraction of the saturated ketone the pH of the aqueous phase is lowered, preferably to between 1 and 2, for example, by the addition of a strong mineral or organic acid to bring about the precipitation of the unsaturated ketone.

Either of the two Girard reagents P or T may be used in the present process; we prefer, however, to use Girard P since this is the more stable compound and can be stored more easily.

We have found that using the process according to the invention it is possible to obtain the unsaturated ketone in a comparatively high state of purity. In addition it carries the advantage that the products are in contact with acid solutions for a short time, thus reducing the possibility of hydrolysis of any ester groupings present, whilst the low temperature at which the reactions may be conducted minimises the destruction of material.

In using the process according to the invention in the synthesis of cortisone, the components to be separated may be cortisone itself and 4:5-dihydroallocortisone or their corresponding 21-esters or 17:21-diesters. We prefer however to separate the unsaturated and saturated compounds before hydrolysis of the ester groups.

According to a specific feature of the invention, therefore, the mixture to be separated contains a 21-ester or 17:21-diester of cortisone and a corresponding ester or diester of 4:5-dihydroallocortisone.

In order that the invention may be well understood, the following examples are given by way of illustration only:

Example 1

A mixture of cortisone-21-acetate and 4:5-dihydroallocortisone-21-acetate ($\lambda_{max.}^{EtOH}$ 238 m$\mu$; $E_{1\ cm.}^{1\%}$ 289)

(3 g.; containing 2.2 g. of cortisone acetate, assessed spectroscopically) and Girard P reagent (3 g.) were dissolved in 10% acetic acid in ethanol (45 ml.), the solution being then heated under reflux for one hour. Aqueous formaldehyde (60%; 6 ml.) was added to the cooled solution which was then allowed to stand at room temperature for 20 minutes. The solution was poured into saturated aqueous sodium bicarbonate (250 ml.) and extracted with ethyl acetate (3 x 150 ml.). The combined ethyl acetate extracts were washed with water, dried over anhydrous magnesium sulphate, and evaporated to dryness under reduced pressure. The residue, crude 4:5-dihydroallocortisone acetate, had $$\lambda_{max.}^{EtOH}\ 236-250\ m\mu,\ E_{1\ cm.}^{1\%}\ 95$$

The bicarbonate solution, after being acidified to pH 1 with conc. hydrochloric acid and pyruvic acid (40–60%; 30 ml.) was left at room temperature for 4 hours. The precipitate was collected, washed thoroughly with water, and dried in vacuo over P$_2$O$_5$. The solid (1.760 g.) with $$\lambda_{max.}^{EtOH}\ 238\ m\mu,\ E_{1\ cm.}^{1\%}\ 351$$

(estimated amount of cortisone acetate 1.58 g., recovery 72%) was crystallised from acetone to give pure cortisone 21-acetate which after drying at 130°/4 hours, had m. p. 244–247°, $[\alpha]_D$ −219° (c, 1.8 in chloroform), $$\lambda_{max.}^{EtOH}\ 238\ m\mu,\ E_{1\ cm.}^{1\%}\ 378$$

Example 2

A mixture of cortisone-17:21-diacetate and 4:5-dihydroallo-cortisone-17:21-diacetate (19.25 g.; $E_{1\ cm.}^{1\%}$ 250)

and Girard P reagent (19.25 g.) was refluxed in 90% ethanol/acetic acid (400 ml.) for 15 minutes, the solution cooled to room temperature and aqueous formaldehyde solution (35%; 80 ml.) added. After ½ hour at room temperature, the mixture was poured into saturated aqueous sodium bicarbonate solution (2000 ml.) and extracted three times with ethyl acetate (Extract A). Concentrated hydrochloric acid (75 ml.) and pyruvic acid (50%; 50 ml.) were added to the aqueous layer, and after 3 hours at room temperature, the aqueous layer was again extracted with ethyl acetate (Extract B).

*Extract A.*—After washing with water and drying over magnesium sulphate, the solvent was distilled off to give crude 4:5-dihydroallocortisone-17:21-diacetate (7.65 g. $[\alpha]_D$+74° (CHCl$_3$).

*Extract B.*—The extract was washed with sodium bicarbonate soution and water, dried over anhydrous magnesium sulphate and the solvent removed under reduced pressure. The crude residue dissolved in methylene chloride/ether (1:2) was filtered through a small pad of alumina (Brockmann Grade II–III) and the solvent removed to give 17:21-diacetoxy-3:11:20-triketoallopregn-4-ene (Cortisone diacetate) (10.31 g.) M. P. 207–214° $[\alpha]_D$+134° (CHCl$_3$) $\lambda$max. 238 m$\mu$, $$E_{1\ cm.}^{1\%}\ 345$$

Example 3

A crude mixture of cortisone acetate and dihydroallocortisone acetate (3.0 g.: $\lambda$max. 238 m$\mu$, $E_{1\ cm.}^{1\%}$ 289)

dissolved in 10% acetic acid in ethanol (40 ml.) was treated with Girard T reagent (3.0 g.) and refluxed for 65 minutes. After cooling, aqueous formaldehyde (6.5 ml.; 36% solution) was added, and the whole allowed to stand at room temperature for 27 minutes. It was then poured into sodium bicarbonate solution (nearly saturated) and the steroid extracted with ethyl acetate (3 x 120 ml.). The ethyl acetate layer was washed with water (3 x 200 ml.), dried and evaporated to a solid residue (1.0 g.) showing $\lambda$max. 238 m$\mu$, $$E_{1\ cm.}^{1\%}\ 218$$

The bicarbonate solution was acidified to pH 1.0 with concentrated hydrochloric acid and pyruvic acid and was allowed to stand at room temperature for two hours. The precipitated solid was then filtered off (1.46 g.) $\lambda$max. 237 m$\mu$, $$E_{1\ cm.}^{1\%}\ 335$$

Crystallisation from acetone and drying at 120° in vacuo gave cortisone monoacetate, $\lambda$max. 237 m$\mu$, $$E_{1\ cm.}^{1\%}\ 358$$

Example 4

13.4 g. of a crude mixture containing cortisone acetate and dihydroallocortisone acetate ($\lambda$max. 238 m$\mu$, $E_{1\ cm.}^{1\%}$ 271)

13 g. of Girard P reagent, 200 cc. of 10% acetic acid in absolute ethanol were refluxed for ½ hour on a steam bath.

The solution was then cooled to room temperature and 27 cc. of a 36% aqueous formaldehyde solution added and allowed to stand for 25 minutes, after which it was poured into a saturated aqueous sodium bicarbonate solution and extracted three times with ethyl acetate. The extract was washed several times with water, dried over magnesium sulphate, and evaporated to dryness under reduced pressure (4.53 g.). Light absorption, $\lambda$max. 238 m$\mu$, $$E_{1\ cm.}^{1\%}\ 90$$

(alcohol). An I. R. spectrum showed it to be essentially dihydrocortisone acetate together with ca. 20% cortisone acetate.

The remaining sodium bicarbonate solution, after this extraction, was acidified to pH 1 with conc. HCl and allowed to stand for ca. 2 hours and then filtered. The white solid material so obtained was washed with water and dried in vacuo (7.22 g.). Light absorption, $\lambda$max. 237.5 m$\mu$, $$E_{1\ cm.}^{1\%}\ 370$$

(alcohol), $[\alpha]_D$=+215 (c, 1.0 CHCl$_3$), M. P. 232–238° (cortisone acetate).

The filtrate yielded a further 1.48 g. of material after extraction with ethyl acetate. Light absorption, $\lambda$max. 237 m$\mu$, $$E_{1\ cm.}^{1\%}\ 332\ (alcohol)$$

Example 5

A crude mixture of cortisone acetate and dihydroallocortisone acetate (2.0 g.; $\lambda$max. 238 m$\mu$, $E_{1\ cm.}^{1\%}$ 253)

dissolved in 10% acetic acid in ethanol (30 ml.) was treated with Girard T reagent (2.0 g.) and refluxed for 35 minutes. After cooling, aqueous formaldehyde (4 mls.:40% solution) was added, and the whole allowed to stand at room temperature for 25 minutes. It was then poured into sodium bicarbonate solution (4%) and the steroid extracted with ethyl acetate (3 x 25 ml.). The ethyl acetate layer was washed with water, dried and evaporated to a solid residue (0.73 g.) showing $\lambda$max. 238 m$\mu$, $$E_{1\ cm.}^{1\%}\ 85$$

The bicarbonate solution was acidified to pH 1.0 with concentrated hydrochloric acid and was allowed to stand at room temperature for 2 hours. The precipitated solid was then filtered off (1.02 g.; $\lambda$max. 237 m$\mu$, $E_{1\ cm.}^{1\%}$ 376)

Example 6

A crude mixture of 4:5-dihydro-allocortisone diacetate and cortisone diacetate ($\lambda$max. 237½ m$\mu$, $E_{1\ cm.}^{1\%}$ 250)

(12.9 g.) was refluxed for 30 mins. in ethanol (340 ml.) containing acetic acid (10%) and Girard P reagent (12.9 g.), cooled to room temperature and aqueous formaldehyde (40%; 50 ml.) added. After allowing to stand at room temperature for 30 mins., the solution was poured into saturated sodium bicarbonate solution (1500 ml.) and extracted with ethyl acetate (3 x 300 ml.). The aqueous layer was acidified to pH 1 with concentrated HCl, allowed to stand for 2 hours and then extracted with ethyl acetate. The organic layer was washed with sodium bicarbonate solution and water and evaporated to dryness. Product (6.04 g.) showed $[\alpha]_D +136°$, M. P. 198–212°, $\lambda$max. 237 m$\mu$, $E_{1cm}^{1\%}$ 341

Example 7

A mixture of Reichstein's Compound S and the corresponding 4:5 α-dihydro ketone, M. P. 216–227°, $[\alpha]_D +89°$ (chloroform)

$\lambda_{max.}^{EtOH}$ 240 m$\mu$, $E_{1cm}^{1\%}$ 225

(2.43 g.) was refluxed in dry ethanol (36 ml.) acetic acid (1.8 ml.) with Girard P reagent (1.3 g.) for 30 mins. The reaction mixture was then cooled to room temperature and aqueous formaldehyde (40%; 5 ml.) added. After standing for 30 mins., during which time a precipitate separated, the mixture was poured into saturated aqueous sodium bicarbonate (100 ml.). Extraction with ethyl acetate (3 x 150 ml.) gave emulsions which were broken by filtration. Decomposition of the separated solid by dilute acid gave crude 4:5 α-dihydro Compound S, M. P. 228–232°, $[\alpha]_D +95°$ (chloroform). The aqueous layer was acidified with concentrated HCl to pH 1.0 and allowed to stand for 2 hours. The brown solid which separated was extracted into ethyl acetate and isolated by evaporation of the solvents. Recrystallisation from acetone gave a product enriched in Reichstein's Compound S, M. P. 235–236°, $\lambda_{max.}^{EtOH}$ 240 m$\mu$, $E_{1cm}^{1\%}$ 386

That enrichment has taken place is apparent from the increase in the intensity of absorption at 240 m$\mu$.

We claim:

1. A process for the separation of 3-keto-Δ⁴-steroids selected from the group consisting of cortisone, 21-monoesters and 17:21 diesters thereof, said esters being derived from lower alkanoic acids, from mixtures of such steroids and 3-keto-4:5-dihydroallosteroids selected from the group consisting of 4:5 dihydroallocortisone, 21-monoesters and 17:21 diesters thereof, said esters being derived from lower alkanoic acids, in which the said mixtures are reacted with a compound selected from the group consisting of Girard reagent T and Girard reagent P to form the Girard derivatives of the respective ketones, the mixed Girard derivatives are treated with a water-soluble aldehyde which can displace the saturated steroid ketone from its Girard complex whereafter the liberated saturated ketone is separated from the mixture in an aqueous medium, the pH of the aqueous medium being thereafter lowered to liberate and precipitate the unsaturated ketone.

2. A process as claimed in claim 1 in which after separation of the saturated ketone, the pH of the aqueous medium is lowered to between 1 and 2 to liberate and precipitate the unsaturated ketone.

3. A process as claimed in claim 1 in which after treatment of the mixture of Girard derivatives with the water-soluble aldehyde, the reaction medium is diluted with water and buffered to approximately pH 7 and the saturated ketone is then extracted.

4. A process as claimed in claim 1 in which the water soluble aldehyde is selected from the group consisting of formaldehyde, acetaldehyde and crotonaldehyde.

5. A process as claimed in claim 1 in which the mixture of the ketones is heated in an organic solvent to form the Girard derivatives, an amount of the water-soluble aldehyde at least equivalent to the amount of Girard reagent used is added to the resulting mixture, the whole is poured into water, the aqueous mixture being buffered to a pH of approximately 7, the precipitated saturated ketone is extracted whereafter a strong acid is added to the aqueous residue to bring the pH thereof to between 1 and 2 and the precipitated unsaturated ketone is separated.

6. A process as claimed in claim 1 in which the Girard reagent employed is Girard reagent P.

7. A process as claimed in claim 1 in which the mixture comprises cortisone 21-acetate and 4:5-dihydroallocortisone 21-acetate.

References Cited in the file of this patent

Girard et al.: Helv. Chim. Acta 19, 1095–1107 (1936).
Reichstein: Helv. Chim, Acta 19, 1107–1126 (1936).
Velluz: Bull. Soc. Chim. 12, 951–952 (1945) 288, 498 (1946).
Fieser et al.: Natural Products Related to Phenanthrene, 3rd. ed., pp. 308–309, 405–406 (1949).